Nov. 17, 1959 G. F. MONTGOMERY 2,913,524
LOUDSPEAKING INTEROFFICE TELEPHONE
Filed June 13, 1958
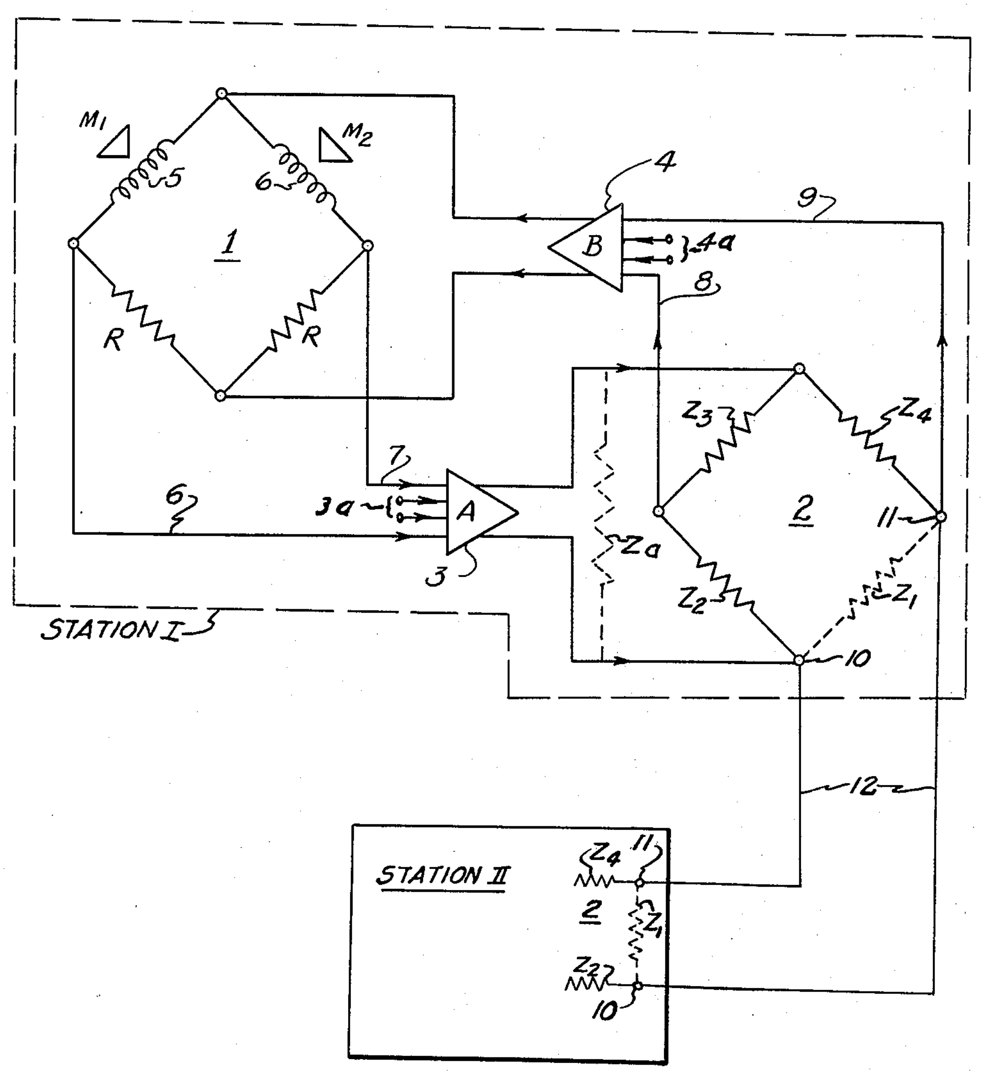
INVENTOR
George Franklin Montgomery
BY Arthur Vinograd
ATTORNEY United States Patent Office 2,913,524

Patented Nov. 17, 1959

2,913,524

LOUDSPEAKING INTEROFFICE TELEPHONE

George Franklin Montgomery, Washington, D.C., assignor to the United States of America as represented by the Secretary of Commerce Application June 13, 1958, Serial No. 741,977

1 Claim. (Cl. 179—1)

This invention relates to wire intercommunications systems and particularly contemplates an improved loudspeaker type of intercommunication system, such as employed to communicate over very short distances.

In accordance with the principles of the present invention, each station in the intercommunication system includes a plurality of transducers employed for both transmitting and receiving sound signals. These transducers comprise the arms of a first bridge. A second bridge is also provided in each station having an impedance equal to that of the impedance of the transmission lines interconnecting the stations and amplifiers are provided in each station for interconnecting the two balanced bridges. Such arrangement dispenses with the need for the switches normally employed in intercommunication systems. The transducers are adapted to be driven in phase as loudspeakers when employed as a receiver and conversely generate power in response to applied acoustic signals thereby acting as a differential microphone to transmit power over the transmission lines.

It is accordingly an immediate object of the present invention to provide an intercommunication telephone system which is simple in construction and reliable in operation.

It is a further object of this invention to provide an improved intercommunication system which dispenses with the need for switching between transmitting and receiving positions.

A still further object of this invention is to provide an improved stable intercommunication system in which two transducers are arranged in a bridge circuit as a differential microphone so as to minimize the transmission of unwanted sound in cooperation with another bridge circuit at each station to match the impedance of the transmission lines interconnecting the various stations of the intercommunication system.

Other uses and advantages of the invention will become apparent upon reference to the specification and drawings in which:

The single figure shows a station-to-station arrangement of the intercommunication system of the present invention together with the circuit details of the mechanism in each station.

The figure shows an over-all schematic of the intercommunication telephone system comprising the present invention. Each station in the intercommunication system comprises a unit the schematic of which is illustrated in station I. The unit in each station comprises a first bridge 1, and a second balanced bridge 2. The output of bridge 1 is connected to the input terminals of bridge 2 by leads 6, 7 and an amplifier 3, while the output of the second bridge 2 is connected to the input of the first bridge 1 by leads 8, 9 and a second amplifier 4. A and B represent the respective gains of the amplifiers.

The mechanism in each station includes two transducers designated in the drawings as $M_1$ and $M_2$. Each transducer may be in the form of a conventional loudspeaker having respective voice coils 5 and 6. Each voice coil forms a respective arm of the balanced bridge 1 as shown.

The amplifiers 3 and 4 are conventional audio amplifiers having terminals 3*a*, 4*a* adapted to be connected to any convenient power source. Amplifier 4 is employed to drive the transducers $M_1$, $M_2$ as loudspeakers. The polarity of the voice coils 5, 6 are arranged such that both of the loudspeakers $M_1$ and $M_2$ will be driven in phase by the amplifier 4. Because of such polarity of the voice coils it follows that the transducers $M_1$ and $M_2$ also will generate electrical power in response to applied sound, the power being proportional to the difference between the sound pressures applied to the two transducers. The two transducers $M_1$ and $M_2$ therefore act as a differential microphone. The resulting electrical output is delivered as an input to the amplifier 3 the output of which is connected to bridge 2.

It will be apparent that if the bridges 1 and 2 are balanced, the circuit represented in Fig. 1 is stable and the gains A and B of the amplifiers 3, 4, can be selected to have any predetermined convenient value. In actual practice, however, it is difficult to match the two transducers $M_1$ and $M_2$ exactly and further the characteristics of the transmission line impedance are such that the second bridge 2 cannot be balanced exactly over the range of audio frequencies employed. The permissible gains of the amplifiers 3, 4 are therefore limited. However, by matching the transducers $M_1$ and $M_2$ as closely as possible the system of the present invention is useful when employed over a wire line of relatively short length such as is used in interoffice communication.

It will be clear from the drawing and the above description that the two transducers $M_1$ and $M_2$ act as a differential microphone when transmitting sound, and as a parallel responder when receiving electrical signals. In intercommunication systems of the present type it is desirable for the transducers, when used as microphones, to be as selective as possible in discriminating between the speaker's voice and background sound. Acoustic reverberations due to room echo of the speaker's voice and of the sound produced by the transducers as loudspeakers, and other extraneous background noise, are obviously undesirable. The use of two transducers in each station in connection with the present invention serves as a differential microphone arrangement in that the electrical output from the microphones will be proportional to the difference between the sound pressure applied to the two transducers $M_1$ and $M_2$ acting as microphones.

With such arrangement the electrical output from the transducers drops off more rapidly with distance between the speaker or other sound source and the transducers than if a single transducer were employed in the microphone. Such characteristics similarly minimize background sounds and reverberations. Accordingly, the arrangement of microphones in the present invention results in a system which is sensitive to sound pressures near the transducer and which tends to minimize those occurring remotely therefrom.

As a result of the above-discussed differential transducer arrangement, when the transducers function as receivers, they operate in parallel and the resulting sound pressure is proportional in this case to the sum of the received electrical impulses.

As indicated in the drawing, the circuit mechanism comprising station I is connected by a transmission line 12 to another point in the intercommunication system designated in the figure as station II. Station II is identical to station I and is therefore indicated only in block diagram form in the drawing. Bridge 2 in each station (only a portion of which is indicated in connection with station II) comprises the impedance arms $Z_2$, $Z_3$, and $Z_4$. The fourth arm indicated as impedance $Z_1$ shown in broken lines in the drawing represents the impedance looking into the terminal of transmission line 12 which connects the units of the intercommunication system through terminals 10 and 11 of each bridge 2.

The bridge $Z_1$ in each station must satisfy two conditions of balance. First it is necessary that the relation:

$$\frac{Z_3}{Z_2}=\frac{Z_4}{Z_1}$$

be satisfied over the audio frequency range of the system.

Second, the impedance of the bridge at terminals 10, 11 must correspond to the characteristic impedance ($Z_1$) of transmission line 12. The first condition can be conveniently met by letting $$Z_2=Z_1$$

and $$Z_3=Z_4$$

For implementing the second condition, it is first necessary to determine the bridge impedance $Z_1$ at terminals 10 and 11. Assuming that $Z_2=Z_1$ and $Z_3=Z_4$ as above, then for the series-parallel arrangement of impedances comprising bridge 2

$$Z_1=Z_3+\frac{Z_a(Z_1+Z_3)}{Z_a+Z_1+Z_3}$$

Let $$\frac{Z_3}{Z_1}=a$$

and $$\frac{Z_a}{Z_1}=b$$

then $$a=\frac{1-b^2}{2b}$$

where $Z_a$ represents the output impedance of amplifier 3.

Additional transducers can be used or incorporated in the bridge 1 in each station in place of the resistance arms $R_1$ and $R_2$.

The above-described intercommunication system requires no switching devices as are customarily required in sending and receiving operations and is highly effective in connection with relatively short line communication such as is encountered in intercommunication systems.

It will be apparent that the embodiments shown are only exemplary and that various modifications can be made in construction and arrangement within the scope of invention as defined in the appended claim.

What is claimed is:

An intercommunication system comprising a plurality of identical send-receive stations interconnected by a transmission line, each station comprising two send-receive transducers each having a voice coil forming a respective arm of a first-balanced bridge, one terminal of each voice coil being connected together in the bridge, the voice coils being poled in the bridge circuit to generate output electrical signals of opposite polarity in response to sound pressures applied to the transducers, a second balanced bridge, first amplifier means connecting the output of said first bridge to the input of said second bridge and second driver amplifier means connecting the output of said second bridge to the input of said first bridge.

References Cited in the file of this patent

UNITED STATES PATENTS 2,531,883 Kaelin ---------------- Nov. 28, 1950